United States Patent [19]
Gaechter et al.

[11] Patent Number: 4,715,714
[45] Date of Patent: Dec. 29, 1987

[54] MEASURING DEVICE FOR DETERMINING RELATIVE POSITION BETWEEN TWO ITEMS

[75] Inventors: Bernhard Gaechter, Balgach; Bernhard Braunecker, Widnau; Fritz Muller, Balgach, all of Switzerland

[73] Assignee: Wild Heerbrugg AG, Heerbrugg, Switzerland

[21] Appl. No.: 686,889

[22] Filed: Dec. 27, 1984

[30] Foreign Application Priority Data

Dec. 30, 1983 [CH] Switzerland .................. 6994/83

[51] Int. Cl.⁴ ............................................. G01B 11/14
[52] U.S. Cl. ...................... 356/375; 356/400
[58] Field of Search ............... 356/375, 400; 33/293, 33/294; 250/237 G

[56] References Cited

U.S. PATENT DOCUMENTS

| | | | |
|---|---|---|---|
| 2,896,327 | 7/1959 | Thomann | 33/293 |
| 3,002,419 | 11/1957 | Vyce | 356/375 |
| 4,029,415 | 6/1977 | Johnson | 33/294 |
| 4,297,033 | 10/1981 | Nelle | 250/237 G |
| 4,384,204 | 7/1983 | Tamaki et al. | 250/237 G |
| 4,461,575 | 7/1984 | Miller, Jr. et al. | 356/386 |
| 4,488,050 | 12/1984 | Iwafune | 33/293 |

*Primary Examiner*—R. A. Rosenberger
*Assistant Examiner*—Crystal D. Cooper
*Attorney, Agent, or Firm*—Roylance, Abrams, Berdo & Goodman

[57] ABSTRACT

The measuring device is used for determining a relative position between a first item and a second item or the image thereof. The items are displaceable or rotatable relative to one another. The first item has a code carrier, which is arranged along a path. The code carrier is provided with a code pattern at right angles to the path. The second item has a code reader oriented on the code carrier path. A computer is connected downstream of the code reader and has means for quantifying the signal supplied by the code reader and for comparing with a stored code image of the code carrier, as well as for calculating the relative position from the comparison result. This measure permits automatic reading of the position, accompanied by a very high measuring accuracy. The measured result can be digitally displayed and, if required, can be directly stored on a data carrier and/or can be further processed in a computer.

28 Claims, 4 Drawing Figures

MEASURING DEVICE FOR DETERMINING RELATIVE POSITION BETWEEN TWO ITEMS

FIELD OF THE INVENTION

The present invention relates generally to the area of optical measuring devices, particularly such devices including means to read bar codes remotely, and such devices useful in surveying and in other areas.

BACKGROUND OF THE INVENTION

There is a need in various fields for technology for non-contacting determination of the relative positions of two parts or items movable relative to one another. These can be parts of precision machines whose positions are to be established with a high level of accuracy, or instrument dials, e.g., reading optical instruments. Thus, e.g., in the case of conventional levelling instruments or levels using a telescope or television camera connected to the instrument, a height reading scale on a remote levelling rod or staff must be read. However, the reading of the remote height reading scale via the telescope requires a relatively high degree of concentration on the part of the observer. Thus, reading errors constantly occur with this method, particularly where the observers are untrained.

Attempts have been made to eliminate the high susceptibility to error of known levels in different ways. Japanese Specification No. 57749-81 proposed providing the levelling staff with coded light sources corresponding to the height on the reading scale. The reading of the staff is to take place with the aid of a receiver adapted thereto. However, the levelling staff is very complicated and is not really suitable for rough use in the open or on building sites. In addition, this levelling staff has a considerable energy consumption, which is also disadvantageous.

According to Australian provisional patent No. 2542/77, the levelling staff is provided with combinations of black and white longitudinal strips and triangles. By scanning these marks at right angles to the staff and on choosing a suitable code, conclusions can be drawn with regard to the measured height from the scanned pulse length. However, in this case, the limited measuring accuracy and the low sensitivity when making readings over longer distances are severe disadvantages.

SUMMARY OF THE INVENTION

The present invention provides a very generally usable measuring device of the character described, which eliminates reading errors, has a high degree of reliability even in rough use and also has high measuring accuracy.

Devices according to the invention permit automatic reading of position, accompanied by a very high measuring accuracy. The measured result can be digitally displayed and, if necessary, can be stored directly on a data carrier and/or can be further processed in a computer. It is even possible to read a scale even if it does not project on the optical axis of the observation telescope. The reading also makes it possible to obtain distance or range information. When used on levels, by incorporating all of the information in the image field concerning the graduated staff into the measuring and evaluation process, it is possible to more accurately determine the level height and range, even when there are serious problems with noise and interference signals, than is possible using known methods and devices.

BRIEF DESCRIPTION OF THE DRAWINGS

The invention is described in greater detail below relative to non-limitative embodiments shown used with a level by way of example, and with reference to the drawings, wherein.

DETAILED DESCRIPTION OF THE PREFERRED EMBODIMENTS

Figure 1:
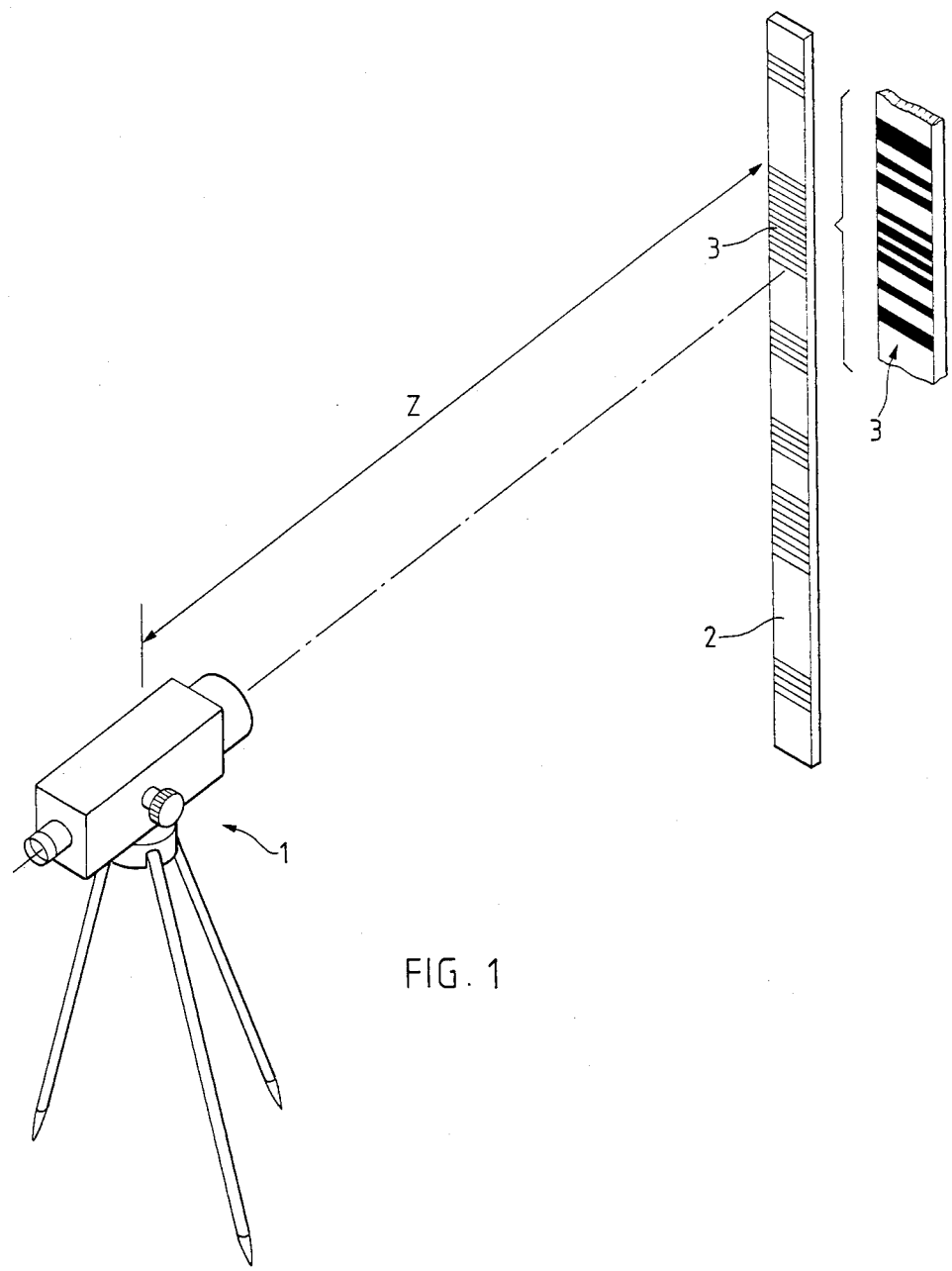
FIG. 1 shows a level with remotely arranged graduated staff and a detail of a bar code provided along the staff.

The levelling means according to FIG. 1, a level being used by way of example to illustrate the invention, comprises a level 1, as well as a levelling staff 2 set up at a distance Z from the level 1. According to the preferred embodiment, a transversely directed bar code 3 is placed longitudinally on the staff 2, and level 1 is used to read the levelling staff 2.

Figure 2:
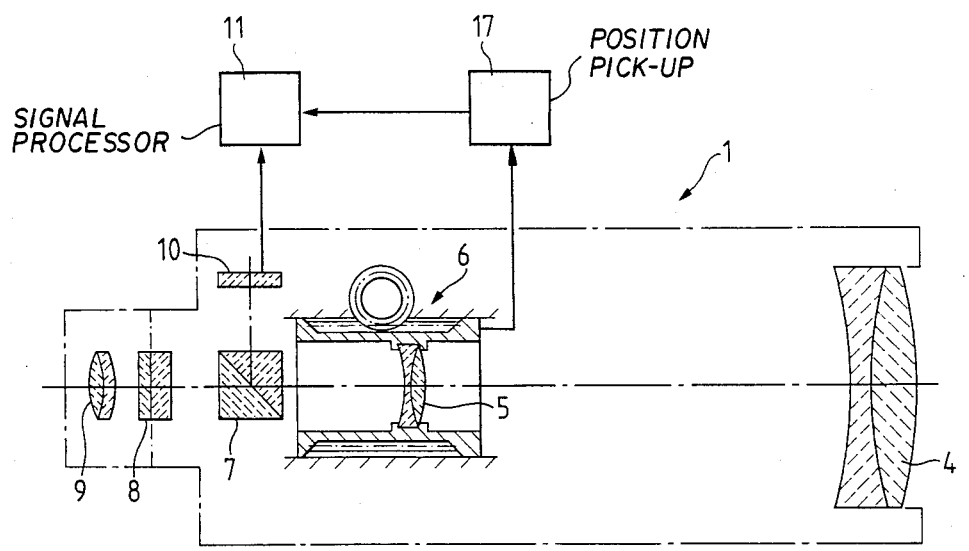
FIG. 2 is a section through the level of FIG. 1.

In FIG. 2, level 1 is shown comprising an objective 4, a focusing lens 5 with associated focusing drive mechanism 6, a beam splitter 7, a reticule 8 and an eyepiece 9. There is also a detector group 10 in the vicinity of the beam deflected from the main beam path by beam splitter 7. The detector group 10 is a transducer used for scanning the image elements at right angles to the optical axis, and for producing electrical signals corresponding thereto. The arrangement is chosen in such a way that the code elements of levelling staff 2 impinging through objective 4 are imaged in the plane of detector group 10. A signal processing device 11, shown in detail in FIG. 3, is connected in series with the detector group 10.

Figure 3:
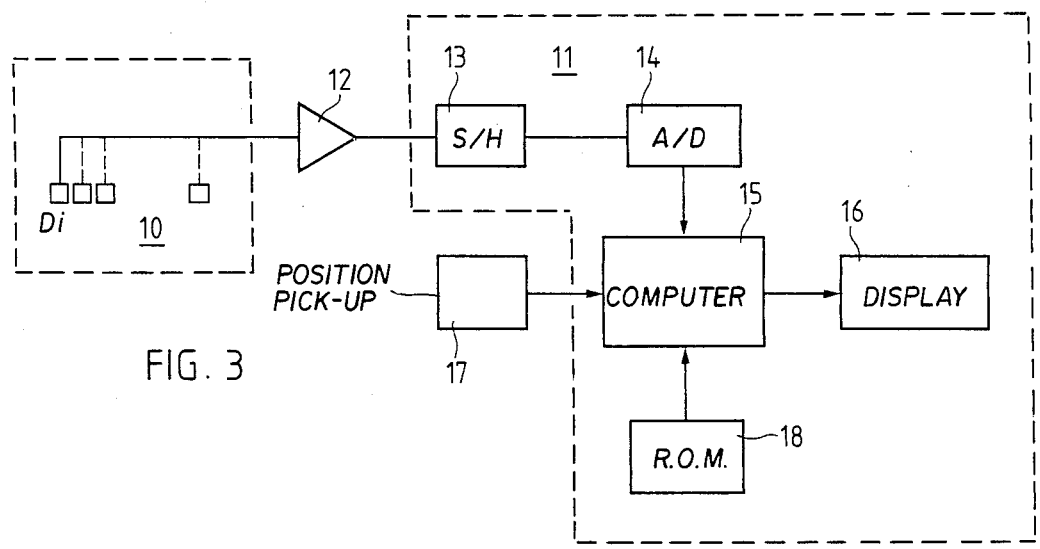
FIG. 3 is a block circuit diagram of an elevational and display means connected to the level of FIG. 1.

Referring now to FIG. 3, in signal processing device 11, the signals of the detectors Qi in detector group 10 are supplied to a computer 15 via an amplifier 12, a sample and hold means 13 and an analog/digit converter 14. A display means 16 for displaying the measured results is connected to the output side of the computer.

To the focusing drive mechanism 6 of the level is connected a position pick-up 17, e.g., a displacement transducer or an angle pick-up coupled to the rotary knob. This device 17 makes it possible to determine the position of the focusing drive mechanism when it is focused on the levelling staff. The output signal of the position pick-up 17 is supplied to computer 15 as a further input signal.

To computer 15 is connected a read-only memory (ROM) 18, in which is stored a reference code corresponding to the bar code on the levelling staff.

The computer determines the position of the code image on the measuring staff and consequently the level height in the manner to be described in greater detail hereinafter by comparing the code image taken by detector group 10 and the reference code stored in the ROM 18.

The actual levelling process consists of pointing the telescope of level 1 at levelling staff 2 and focusing with the focusing drive mechanism 6. From the telescope focusing position supplied by the position of pick-up 17, the computer initially determines the distance Z between level 1 and levelling staff 2. For this purpose, the ROM 18 contains corresponding calibration constants for the distance Z, as a function of the focusing position.

On the basis of the focal length f of the telescope objective, which is preferably also stored in ROM 18, and the previously determined distance Z between the level 1 and the levelling staff 2, computer 15 calculates the image scale m in accordance with the equation $m = -f/Z$. The levelling staff 2 is imaged on detector group 10 with this image scale.

Figure 4:
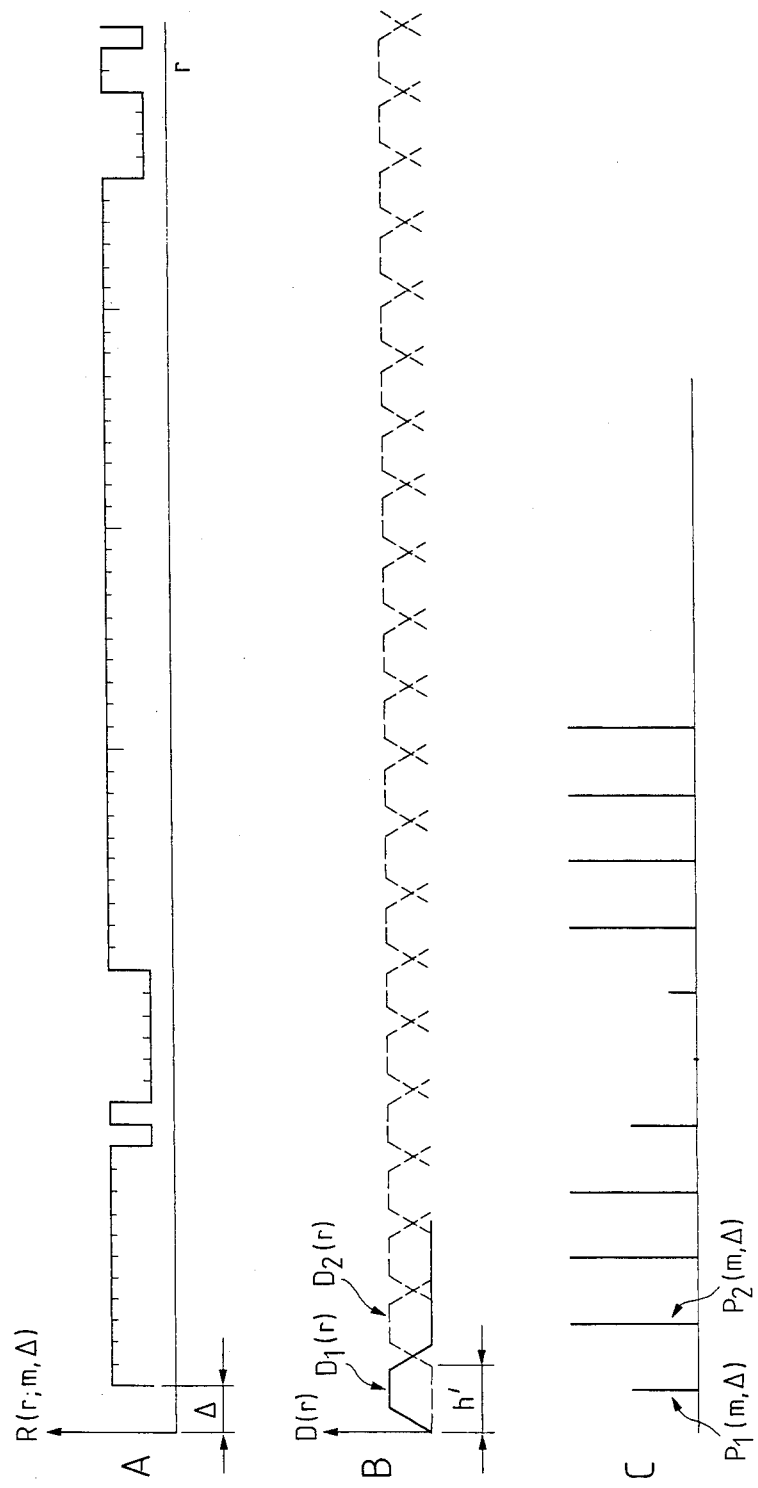
FIG. 4 shows signal diagrams A, B and C useful in explaining the operation of the invention.

The operation of the signal processing device 11 for the selected example will now be explained relative to FIGS. 4A to 4C. FIG. 4A shows the signal for the reference code $R(r; m, \Delta)$, read out from the ROM 18 and for ease of understanding this signal is shown in the plane of detector group 10 and as a function of the position r of the individual detectors Di in this plane. Thus, r represents the variable, while the image scale m is to be considered a parameter. $\Delta$ is also a parameter and represents the relative position of the beginning of the code to the beginning of an individual detector element D according to FIG. 4B.

The selection of the code representation or the detector arrangement is made in such a way that the distance $\Delta$ is always smaller than the detector spacing h' between two adjacent detector elements Di, see FIG. 4B.

As a function of the location position r, FIG. 4B now shows the sensitivity curves D(r) of the individual detector elements Di (r), for $i = 1, 2, \ldots N$.

As a result of a correspondingly chosen control program, computer 15 is made to continuously multiply the value of the reference code $R(r; m, \Delta)$ with the associated value of the detector sensitivity curve D(r) according to FIGS. 4A and 4B and to integrate the same over the position r. The result is constituted by the discrete values $P_1, P_2$, etc., $(m, \Delta)$ plotted in FIG. 4C:

$$P_1(m, \Delta) = \int_0^\infty R(r; m, \Delta) \cdot D1(r) \cdot dr$$

The sensitivity curve D1 (r) is then displaced by a suitable computer manipulation by the detector spacing h', is multipled by $R(r; m, \Delta)$ and integrated. A second discretizing value $P_2(m, \Delta)$ is obtained from this operation. This process is repeated until the complete reference code is covered. The result is diagrammatically shown in FIG. 4C.

In a program-controlled manner, computer 15 finally determines the cross-correlation $K_L(m, \Delta)$ between the intensity values Qi measured by the individual detection elements Di in detector group 10 and the calculated discretized reference values $P_i(m, \Delta)$, according to the following formula, in which N is the number of detector elements used:

$$K_L(m, \Delta) = \frac{\sum_{i=1}^{N} Q_i \cdot P_{i+L}(m, \Delta)}{\sqrt{\left(\sum_{i=1}^{N} Q_i^2\right) \cdot \left(\sum_{i=1}^{N} P_{i+L}^2\right)}}$$

On the basis of the thus calculated cross-correlation function values, the computer 15 then seeks in a program-controlled manner the displacement with the maximum value of the previously determined cross-correlation. The parameters m and $\Delta$ are then varied and by known numerical mathematical methods, the maximum value of the cross-correlation function $Kl(m, \Delta)$ is determined as a function of L, m and $\Delta$.

From the thus calculated values for L, m and $\Delta$, is selected the value group with the highest correlation and from the corresponding parameters the reading position is calculated, i.e., in the present example the level height.

For the initially performed determination of the distance Z between level 1 and levelling staff 2, there is an accuracy estimate $\Delta Z/Z$ on the basis of the following:

$$\Delta Z/Z = OPD \cdot 8 \cdot Z/D^2$$

D being the aperture of the objective lens in level 1 and OPD the optical phase difference. If a value $OPD \leq \lambda/2$ and $D = 40$ mm is assumed for the OPD, then the relative distance precision $\Delta Z/Z$ is better than $\pm 14\%$ for $Z = 100$ m and better than $\pm 0.7\%$ for $Z = 5$ m.

In order to be suitable for the described use and processing, bar code 3 must fulfill the following conditions. As the image scale of levelling staff 2 varies on the plane of the detector group with the distance D between level 1 and levelling staff 2, the image scale m is subject to considerable variations. For example, on varying the distance Z from 1.5 to 100 m, there is a change to the image scale by the factor 66.6.

As the individual elements Di of detector group 10 have a finite distance from one another, the projection of a code element onto a detector element must be greater than the reciprocal spacing h' of the detector elements, so that the latter can still resolve the code. Thus, on the basis of the Nyquist theory taken from communications engineering, the projection of a code element G' should be at least twice as large as the reciprocal spacing h' of the detector elements.

This condition fixes the size of the code grid G to be chosen for the levelling staff 2, as $G \geq 2$ h' m, m now being the image scale for the maximum measuring distance Z of the staff in the plane of detector group 10.

In the case of short distances Z between level 1 and levelling staff 2, with a limited number of detector elements available via the telescope, the visual field will be so small that there are only a few grid elements G in the visual field of detector group 10. This number of grid elements can be so small that it is not sufficient for a clearly defined code formation and consequently for a clear and precise reading of the code carrier. In order to overcome this problem, in such cases use is made of optics with a variable focal length, such as a zoom lens or a magnification changer in the reader, i.e., in the present example on level 1. The device for scanning the visual field (scanner) is also suitable for this purpose.

Another solution of the aforementioned problem is to subdivide the grid elements of the code, either the bright or the dark parts or both, by a finer grid system to consequently form a further fine code. This fine code will not be "seen" by the detector group 10 for large distances Z, and instead acts as a grey value. In the case of short distances Z, the sine code helps to clearly determine the position on the detector group in the case of a limited visual field. A code grid has proved suitable as a coarse code which is approximately 1.5 times the image size of the line spacing on the code carrier for the largest measuring distance Z occurring in practice.

It is further pointed out that the code carrier can have any random shape determinable by a scanner, e.g., it can also be circular. This makes it possible to automatically and very accurately scan the angular position of a component connected to the code carrier. The necessary calculating operation is simplified in that the image scale m can be looked upon as a system-related fixed quantity, provided that the distance between the code carrier and the reader is fixed, which would be appropriate for most such applications.

In place of the cross-correlation described in the preferred embodiment, the comparison operations performed in the computer could also consist of a random integral comparison operation. Then, many and preferably most of the detector elements on which the code pattern is imaged will be used for comparison with the reference code.

Instead of processing the derived signals in connection with levelling means from position signals on levelling staff 2, the same derived signals can be used for direct measurement of an angle position, related to any defined position. For instance, levelling staff 2 may be connected in a defined position to a distant machine part, or respective code patterns may be directly fixed to such part. If this part moves in a direction parallel to the code pattern's axis, it is possible to directly compute angle values corresponding to the displacement of such part against the former position for the former defined reference.

While the invention has been described in detail above, it is to be understood that this detailed description is by way of example only, and the protection granted is to be limited only within the spirit of the invention and the scope of the following claims.

What is claimed is:

1. A measuring device for determining the relative position between a first item and a second item, said first and second items being movable with respect to each other, said first item comprising a code carrier, a single passive dimensional code pattern arranged on said code carrier; said second item including optical means to remotely read said passive code pattern, code reader means to sample the image of said code pattern and to produce a digital signal corresponding thereto, computer means to receive said signal, said computer means comprising means to store information corresponding to said passive code pattern, said code pattern being able to retain the quasi-stochastic characteristics required for decoding, and said computer means comprising means to integrate and compare at least a part of said sampled signal to a corresponding part of said store information to thereby determine said relative position.

2. The measuring device according to claim 1, wherein said items are movable with respect to each other by translation or by rotation, and means to arrange said single dimensional code correspondingly.

3. The measuring device according to claim 1, said second item including means to determine the horizontal distance between said first and second items, said means to read said code pattern also determining the vertical distance between said first and second items, and means to correct said code pattern signals dependent upon said determined horizontal distance.

4. The measuring device according to claim 1, wherein said computer means are designed for quantifying said signals from said code reader, as well as for integral comparison between said signals and a stored reference code.

5. The measuring device according to claim 1, wherein said computer means are adapted to perform a cross-correlation comparison between said signals and said stored information.

6. The measuring device according to claim 1, wherein the code reader contains a group of detector elements arranged in an image plane.

7. The measuring device according to claim 1, wherein the coder reader is connected to means for sampling.

8. The measuring device according to claim 6, wherein the computer means are adapted to modify the stored information with the sensitivity values of the detector elements and said computer means comprises a comparator for comparing the signal friom said detector group this operation with said signal.

9. The measuring device according to claim 6, wherein said computer means are adapted to displace the reference code by fractions of the detector spacing.

10. The measuring device according to claim 1, said optical means comprising a telescope, said telescope comprising a focusing drive mechanism connected to a position pick-up means, and means to connect the output of said position pick-up means to said computer.

11. The measuring device according to claim 1, wherein the code pattern comprises at least one coarse code and at least one fine code, whereby said device can be used to measure relatively long distance using said coarse code and relatively short distance using said fine code.

12. The measuring device according to claim 1, said second item comprising a level, and said first item comprising a levelling staff.

13. The measuring device according to claim 1, and means to use said device as a range finder.

14. The measuring device according to claim 1, and means to use said device as a clinometer.

15. A method for determining the relative position between a first item and a second item wherein said first and second items are movable with respect to each other, comprising the steps of providing a code carrier on said first item, arranging a single dimensional passive code pattern on said code carrier, remotely reading said code pattern using optical means on said second item, using code reader means to convert the image of said code pattern into a signal, using computer means to receive said signal, storing information corresponding to said code pattern in said computer means, said code pattern being able to retain the quasi-stochastic characteristics required for decoding, and using said computer means to compare and integrate said signal to a corresponding part of said stored information to thereby determine said relative position.

16. The method according to claim 15, wherein the image scale of said stored information is derived from a distance determination between the code carrier and the code reader and is incorporated into the calculation process.

17. The method according to claim 15, determining the maximum value of a cross-correlation function using a computer program controlled optimization calculation by varying the reference code image scale and its relative position to detector elements in said second item.

18. The method according to claim 15, wherein use is made of a course distance determination between the code carrier and the code reader for calculating the initial image scale for generating a reference code corresponding to said stored information for optimization purposes.

19. The method according to claim 15, wherein said items are movable with respect to each other by translation or by rotation, and the step of arranging said single dimensional code correspondingly.

20. The method according to claim 15, determining the horizontal distance between said first and second items, reading said code pattern to determine the vertical distance between said first and second items, and correcting said code pattern signals dependent upon said determined horizontal distance.

21. The method according to claim 15, wherein the code pattern reading is done with time-staggered scanning.

22. The method according to claim 15, wherein the code reader contains a detector group arranged in an image plane, modifying the stored information with the sensitivity values of the detector group, and comparing the signal resulting from this operation with said signal in said computer means.

23. The method according to claim 15, wherein the code reader contains a detector group arranged in an image plane, and displacing the reference code by fractions of the detector spacing, as needed, in said computer means.

24. The method according to claim 15, at least one of said items comprising optical means, said optical means comprising a telescope, said telescope comprising a focusing drive mechanism connected to a position pick-up means, and the step of connecting the output of said position pick-up means to said computer.

25. The method according to claim 15, at least one of said items comprising optical means, producing at least one coarse code and at least one fine code in the code pattern, measuring relatively long distances using said coarse code, and measuring relatively short distances using said fine code.

26. The method according to claim 25, designing said coarse and fine code patterns so that after quantification, said fine and coarse code patterns retain the quasi-stochastic characteristics required for decoding.

27. The method according to claim 15, at least one of said items comprising optical means, and using said at least one item with optical means as a range finder.

28. The method according to claim 15, at least one of said items comprising optical means, and using said at least one item with optical means as a clinometer.

* * * * *